United States Patent Office 2,866,720
Patented Dec. 30, 1958

2,866,720

DECORATIVE COATING AND METHOD OF MAKING SAME

William H. Martin, Grosse Pointe, and Edwin B. Morin, Allen Park, Mich., assignors to American-Marietta Company, a corporation of Illinois No Drawing. Application October 24, 1955
Serial No. 542,519

11 Claims. (Cl. 117—72)

This invention relates to novel methods of decorating a surface with a crackle finish and to articles produced by such methods. More specifically, the invention is concerned with the application of transparent or translucent discontinuous crackle film areas which are substantially uniform in thickness and which adhere to a smooth thermosetting enamel base of any desired sheen or color so as to produce decorative finishes of the type known as "alligator" finishes.

The crackle finishes of the present invention are characterized by well defined "island" areas, which may be generally uniform in size or which may vary in size gradation from larger to smaller islands and by "rivers" between the islands which are fairly uniform as to width. In contrast to wrinkle finishes and pebbled finishes, which are characterized by a pattern formed by the drying characteristics of the base film containing a wrinkling oil or by the deformation of the base film due to the solvent effect of a volatile solvent for the resin and pigment components of the base film, the crackle finishes of the present invention comprise a smooth, wholly undeformed, uniformly pigmented, thermosetting enamel base film which is crackled by the spray application of the thermoplastic "islanding" material at a specified drying stage, the "wet set" condition, in the preparation of the pigmented thermosetting base coat to produce permanent island areas of uniform thickness, which will withstand exposure to strong sunlight, washing, abrasion, or sharp impact without damage to the surface.

The new method and crackle finishes of the present invention may be used to produce finishes for interior or exterior use, but the preferred field of application is as an interior automotive metal finish, particularly for automobile instrument panels, airplane instrument panels, an exterior finish for sport car tops and the like, which subjects the finish to marked differences in sunlight, temperature and humidity and which necessitate the requirement that the finish be relatively permanent under these atmospheric conditions, be easily restored by cleaning, be resistant to commercial automobile cleaners containing solvents and have good adhesion throughout the long life of the finish.

In producing the simulated leather or alligator finish of the present invention, it is highly desirable that the finish have a high gloss or sheen which can be adjusted within a range of glosses to blend in harmoniously with the variety of color shades which are commercially used in automotive finishes.

It has been found that the required range of high, medium and low gloss coatings which are used in these automotive finishes are provided from gloss qualities of the base coating itself, which may be the same coating of the same pigment value as used in other non-alligator finished parts of the automobile due to the feature of using a clear or translucent glossy crackle coating.

The use of this clear or translucent coating may serve as a basis for an additional control of the gloss of the base coat, since the addition of a small amount of a flatting agent such as silica gel (Santocel #54 sold by Monsanto Chemical Co. or Syloid sold by Davison Chemical Corporation), to the crackle coating serves to reduce the glossiness of the finish and to provide a decrease in the sheen, thereby compensating for excess glossiness in the base coat. This control feature of the invention provides an important technical advantage over prior art processes which have used a glossy overcoating with a high gloss clear varnish in order to produce the desired glossiness.

Although crackle finishes are well known and many desirable results have been achieved in the use of these finishes for interior use, the crackle finishes in the prior art have generally achieved the decorative effect through the pigmentation of the crackle areas and by using a nitrocellulose top coat which is applied in the form of blotches to the base coat (see Smedley, United States Patent 2,078,291).

As taught in the Smedley patent, the nitrocellulose lacquer applied as the top coat is thickened with a rubber ingredient or with a rubber derivative, such as rubber hydrochloride or chlorinated rubber, to form blotches of pigmented lacquer that adhere to the smooth hard dry base coat. These blotches are not uniform in thickness due to their stringy and rubbery character and the larger blotches are thicker than the smaller blotches since they do not spread as rapidly over the base surface as the smaller blotches.

However, the principal defect in these prior crackle coatings is not so much the fact that the control for producing uniform crackle is difficult. Instead it is the difficulty which is encountered with the cellulosic polymers employed.

Nitrocellulose lacquers, although inherently fast air drying by evaporation to produce a film having good strength, have the very undesirable tendency to chalking and dulling which is aggravated by exposure to heat and to ultraviolet light. The use of pigments to minimize these defects merely extends the outdoor life of the film by a few months at best. Other expedients have been tried which are more expensive, such as the use of a stabilizer and pigment in the nitrocellulose and an additional outer protective coating of a light stable resin film former over the nitrocellulose (see Barrett, United States Patent 2,063,078). Unfortunately, the auxiliary protective coating merely postpones the time until the coating begins to deteriorate and the proper feel of an "alligator" coating is lost.

Under severe exposure conditions, such cellulosic polymers as cellulose acetate become imbedded with water borne dirt due to the water permeability of this material and there is required the use of cleaner abrasives for the dirt removal. Such cleaning tends to make the coating cloudy and discolored in time. Water-impermeable films such as nitrocellulose films under severe exposure conditions reach the same undesirable cloudy state due to the increase of porosity of the film resulting from the decomposition of the nitrocellulose and this increases the tendency of the film to absorb dirt, grease and foreign matter while the film strength is decreasing.

Benzyl cellulose, although otherwise displaying good properties as a crackle coating in accordance with the invention, has too low a softening point to withstand severe summer conditions encountered in outdoor exposure of automotive finishes, tends to flow and is therefore unsuitable.

It is surprising that cellulosic polymers such as ethylcellulose and cellulose acetate butyrate provide such excellent results as a crackle coating lacquer over the thermosetting base coat in the wet set condition. Both of these cellulosic polymers are readily available commercially and both possess good resistance to heat, good resistance to ultraviolet light and excellent water resistance.

Other thermoplastic resinous film formers may be used for interior finishes in carrying out the method of the present invention, such as rubber hydrochloride, vinyl chloride-vinyl actetate copolymers (95% or more chloride content), methacrylate resins (methyl, ethyl, propyl, butyl, furfuryl, or benzyl), rubber hydrochloride resins and other cellulose esters of monobasic organic acids such as acetic or propionic acid. However, for exterior use as an automobile finish only the methacrylat resins exhibit the necessary stability properties in the same manner as cellulose acetate butyrate and ethyl cellulose to produce durable and serviceable "alligator" finishes.

Important technical advantages are provided by the present invention over prior art finishes such as described in Hookway, United States Patent No. 2,714,560, which produce a flat crackle finish through the use of synthetic rubber-water emulsion paints applied as a continuous coating. The present invention attains better gloss, better color and a more suitable alligator finish than is possible by using a water emulsion paint. The organosol finishes applied by the methods of Chavannes, United States Patent No. 2,575,046, and Frances, United States Patent No. 2,565,491, are unsatisfactory for automotive finishes since they wrinkle the base because of the solvent action of the lacquer vehicle on the base.

The pigmenting of the crackle coating lacquer produces an effect which is indesirable from the standpoint of the economy of processing and from the standpoint of the decorative effect obtained. The use of a clear transparent or translucent unpigmented crackle coating in accordance with the present invention produces a marked improvement on the process and in the decorative effects which become available. The color of the finish obtained with a pigmented crackle lacquer is essentially different than with an unpigmented lacquer due to slight differences in thickness of the island areas, even if the island areas are pigmented in the same manner as the base coat. Corresponding to these differences in thickness there are produced darker and lighter areas due to the differences in light reflection. Unpigmented islands having the same differences in thickness do not show these color differences. Also, the matching of the same color in the island and the base coat is difficult because of the difference in the resins which are the film formers in the two coatings.

In contrast to this, a greater uniformity in thickness of the island areas is obtained by the process of the invention. The uniform transparency or translucency of these areas in combination with uniform thickness which produces a more uniform color effect by reflected light which is easier to match and indeed may be controlled almost exclusively by the shading and sheen which is provided in the base coating. Added control is had by using a slight amount of an opacifying agent having substantially no effect on the color of the base coat when viewed through the translucent slightly opacified island areas. Such agent may be silica gel which converts a transparent film into a translucent film without altering the reflection of color through the film.

It is an object of the invention to provide new and improved glossy decorative crackle finishes suitable for use as an automotive finish under severe service conditions, available in a wide range of alligator patterns, color and sheen, prepared by an economical, dependable and simple plant coating process using readily available enamel and lacquer materials and meeting the stringent requirements of the commercial automotive finishes, particularly as to water absorption, adhesion, mar-resistance, abrasion-resistance, resistance to cleaning agents and long life.

A further object of the invention is to provide a new and simple method for the manufacture of glossy crackle coatings, using readily available enamel and lacquer materials, said method comprising the spray application of uniform droplets of a liquid solvent-crackle resin composition by the gentle spattering action of a fluid pressure spray gun which uniformly enlarges the size of the droplets by controlling the fluid pressure in the gun, said droplets applied to a pigmented, smooth substantially solvent-free but solvent-wet oleoresinous, alkyd or amino modified alkyd enamel base coating at a stage before the base coating is dry.

Other and further objects of the present invention will appear from the more detailed description set forth below, it being understood that such more detailed description is given by way of illustration and explanation only, and not by way of limitation since various changes may be made without departing from the scope and spirit of the present invention.

The base coating is an essential element of this invention and comprises a pigmented, abrasion and mar-resistant synthetic resin glossy varnish which provides a uniform, durable, smooth, glossy, strongly adherent film to the substrate, preferably metal, and which is available in a complete range of color and sheen, and is resistant to commercial cleaners containing acids and alkalis, to water and water spotting, to strong sunlight and to color change with aging.

The synthetic resin film former of the base coat may include oleoresinous varnishes such as short-to-medium oil varnishes (6–30 gal. oil to 100 lbs. resin) prepared from drying or semidrying oils, one or more of linseed oil, tung oil, oiticica oil, dehydrated castor oil and the like and various thermosetting resins such as phenolic resins, or the modified phenolic resins such as substituted phenolformaldehyde condensates heat-soluble in drying oils, or the heat reactive and non-heat reactive 100% phenol-aldehyde condensates or terpene-phenolic resins, or alkyd resins, or styrenated alkyd resins, or epoxy resins, or silicone resins.

In the wet condition of the base coat, the pigmented oleoresinous, alkyd or equivalent thermosetting base film has removed therefrom substantially all of the volatile solvent which is released from the base film by evaporation, and the resinous film former is substantially immobilized, or set in a gel condition in which the pigment is uniformly dispersed and which displays the inherent medium to high gloss condition of the film.

This wet condition varies somewhat with the nature of the resinous film former of the base coating, is short of the "finger-print condition" at its wettest stage, but may extend through the finger-print condition, to produce a degree of porosity in the solvent-wet thermoset immobilized gel of the base coating which will permit permeation of the film by the solvent in the crackle lacquer to improve adhesion, but which will produce no substantial permeation by the polymer of the crackle coat and no lifting of the pigment in the base coat by the action of the solvent in the spatter areas.

In applying the top crackle coat to the base coat by the gentle spattering action from a fluid pressure spray gun, advantage is taken of an ordinarily undesirable spraying condition which is well known to those skilled in the art, namely, the condition in which the crackle coating liquid emerges from the nozzle of the spray gun in the form of tiny droplets of uniform size and are deposited on the base coat having its thermosetting gel in the solvent-wet, set condition.

Depending on the thickness of the base coating in the wet, set condition, the particle size of the droplets of the liquid crackle coating composition and the flow characteristics of the liquid crackle coating composition in contact at the island areas with the wet set base coating, the size of the uniform island areas may vary from an average diameter of ¼ inch or less to ¾ inch up to a diameter of 1 to 2 inches, the island areas having a thickness of from 0.0001 inch to about 0.004 inch.

It has been found, using cellulose acetate butyrate, for example, which is incompatible in the balanced solvent vehicle containing strong ketone solvents and/or aromatic solvents (toluene and naphtha), with the dried glossy oil-modified alkyd-amino resin base coating in the wet, set condition, that the solvent of the top coat brings about a merging or welding of the top coat in the island areas with the base coat while leaving unimpaired the gloss, sheen and color in the island as well as the river areas.

Generally, it has been found that thicker base coats in the wet, set condition provide somewhat thinner although uniform island areas and larger islands, while thinner base coats provide somewhat thicker although uniform island areas and smaller islands in the finished dry product, utilizing substantially the same particle size of sprayed droplets. Since the island dimensions in the crackle coating are attained after final shrinkage of the wet, set base coating adhered to the island areas, the separation between the islands is slightly greater with greater thickness of the base film and with those oil-modified base coating materials having inherently greater shrinkage characteristics during drying.

The wet, set condition of the base coating in which the above factors are observed, is a condition familiar to those skilled in the art, and properly defines the condition of the base to permit proper timing of the second coat application of the spattered areas of crackle coating. In this immobile condition the inherent flow property of the dispersed resin gel, the character of the solvent and the pigment concentration each contribute, as is known, to the ability of the base coating to flow and level out to a smooth surface before drying.

The higher-solvent-power-types of solvents used with the oleoresinous or alkyd varnishes of the present invention, based all or in part on aromatic hydrocarbons, give uniformly fast setting and high solvent release so that but a few percent of solvent at most is retained in the wet condition of the base coating in which the resin is immobile and at which the crackle coating is applied. This stage is easily recognized by inspection of any one or all of the following known drying characteristics of the wet, set base coat:

(1) The shrinkage of the glossy level base coating due to solvent release falls to a minimum when the immobile gel is formed;

(2) Short of the "finger-print" condition, merely touching the coating discloses an immobile gel far less adherent to the fingers than the sticky gel found during the mobile gel phase containing larger amounts of solvent;

(3) By wetting the immobile wet gel with the solvent of the crackle coating composition no change in gloss, no lifting of the pigment and spotting of the base coat is produced; and (4) Adhesion of the crackle coating composition to the base coat is improved due to wetting with the crackle coating solvent and due to the incompatibility of the base and crackle resins. This adhesion with the crackle coating is not obtained unless the base coating is in the wet, set condition.

The preferred film former of the base coat is an alkyd resin. The alkyd resin film former of the base coating is preferably a short-to-medium-oil phthalate alkyd and is modified with an amino resin such as a urea-formaldehyde condensation product or a melamine-formaldehyde condensation product. Such modified alkyd resins produce very hard, almost colorless films having excellent adhesion to metal surfaces and readily applied either by baking or as air-drying coatings. The proportions of amino resins may vary with the type of coating, generally between 15–30% based on the oil modified alkyd but preferably less than 30%, and as low as 5–10% for automobile finishes where the coating is applied under low baking conditions.

The melamine modified resins are preferred for automobile finishes since they bake faster, have better heat stability and alkali resistance and stand up better for exterior exposure. Generally, it is sufficient to bake the alkyd amino type finishes for about 30–45 minutes at 250–300° C. and these finishes are fast-drying even in the absence of a small amount of metallic dryer, care being taken that wrinkling is not produced during baking. In general, increasing the proportions of amino resin above 5% prevents wrinkling, increases surface hardness, scratch resistance and exterior durability.

The short-to-medium oil type alkyd may be an oxidizing oil-modified alkyd such as:

Rezyl 330-5 (trademark of American Cyanamid Company) composition:
    39% minimum phthalic anhydride,
    40% minimum castor oil acid and acid number 4–10;

Rezyl 387-5 (trademark of American Cyanamid Company) composition:
    41% minimum percent phthalic acid anhydride,
    33% minimum percent soybean oil and acid number 6–12;

Rezyl 435-1 (trademark of American Cyanamid Company) composition:
    34% minimum phthalic acid anhydride;
    48% minimum oil acids, acid number 6–12, or each of these above modified with from 5–20% of melamine-formaldehyde or urea-formaldehyde resins.

Instead of soybean or castor oil, tung oil or linseed oil may be used as the modifier for the oxidizing oil-modified alkyds. For smooth finishes tung oil is used with less reactive oil acids.

The modified alkyd resins include polyesters such as the "reactive polyesters" based on linear alkyd resins (maleic or fumaric acid) with a reactive vinyl or allyl monomer, phthalic acid anhydride alkyd resins, carbic anhydride alkyd resins, "Petrex" alkyd resins, citric alkyd resins, aconitic alkyd resins, tricarballylic alkyd resins, tetrachlorophthalic anhydride alkyd resins (fire resistance), the alkyd resin from linoleic dimer acid, the alkyd resin from the addition product of 1-pimaric and maleic anhydride, etc.

The alcohols forming these alkyd resins may be glycol, diethylene glycol, propylene glycol, trimethylol propane, glycerine, pentaerythritol, dipentaerythritol, sorbitol, mannitol, etc.

In place of the alkyds, oxidizing or non-oxidizing styrenated alkyd resins may be used and these styrenated alkyd resins are improved by the addition of the amino resins in the same manner as the alkyd resins. Somewhat faster baking is attained with the styrenated alkyds. These styrenated alkyd resins are well known commercially and may be prepared by the reaction of a styrenated fatty acid such as dehydrated castor oil acids with phthalic anhydride and polyhydric alcohol such as glycerine, ethylene glycol, diethylene glycol and the like. Methods for preparing styrenated alkyd resins are described in United States Patents Nos. 2,470,752, 2,495,458 and 2,549,767, issued to the Arco Company.

The epoxy resins are available commercially as baking or air-drying finishes under the trademark "Epon" resins (Shell Chemical Company) and a typical formulation is one prepared by reacting Epon 1004 (a condensation product of a dihydric phenol and epichlorhydrin) with dehydrated castor oils (about 40% oil acids), corresponding to the short-to-medium-length alkyd. The epoxy esters of the fatty acids are modified in the same way and in about the same proportion with the amine resin as are the alkyd resins. About 5–30% melamine-formaldehyde resin with 70% of the Epon resin can be dissolved in xylene and naphtha to produce a baking schedule of 30 minutes at 250–300° C. to provide a film having good flexibility, high chemical resistance and excellent adhesion.

The epoxy resin formulation just mentioned may be modified with a non-oxidizing alkyd in the amine resin formulation and up to 50% of the non-oxidizing alkyd may be present with about 3% of the epoxy resin and the remainder being amino resin.

The silicone resins, useful as thermosetting base coating film formers, include silicone-alkyd resins such as Plaskon Resin ST–873 (Libbey-Owens-Ford Glass Company) which contains an oxidizing alkyd component or Silicone Resins XR–379 and 398, the former being a 75–25 mixture of silicone to alkyd, and the latter being a 25–75 mixture. These latter resins are manufactured by Dow Corning Company and may be modified up to 40% with both alkyd resins and amino resins.

The baking schedule is higher for the silicone resins, the temperatures ranging up to 450° F. It is preferred to add a non-oxidizing alkyd in amounts up to 40% in order to permit better solvent control in the wet gel state, thereby attaining improved adhesion of the crackle coating component to the silicone base material without introducing any marring of the gloss of the silicone base coat.

The enamels of the base coat applied by the spray method utilize a balanced solvent having the correct rate of evaporation and solvent power to prevent "orange peel" due to too rapid loss of a solvent of too high a volatility.

The pigmentation of the base coat may employ any of the available or commonly used automobile finishing pigments such as carbon black, lithopone, titanium dioxide, lead chromate, copper phthalocyanine blue, ferrite yellow, red iron oxide, chrome green, cadmium red, phthalocyanine green, etc., or dyestuffs such as alizarine cyanine green, indanthrene blue, etc. The pigments may be metallized, if desired, with a few percent of finely divided metallic pigments such as aluminum pigment and the like.

Despite the incompatibility of ethyl cellulose and cellulose acetate butyrate with the preferred modified resin base coat, these transparent crackle coatings applied to the base coating adhere surprisingly well and provide a crackle surface having the service life within the span required for automotive finishes.

Cellulose acetate butyrate comprises the mixed esters in which the substitution of acetyl and butyryl groups may vary between about 6–32% acetyl and about 16–48% butyryl. The higher acetyl substitution is combined with the lower butyryl substitution and vice versa so that about 45–60% of substitution is obtained on a weight-percent basis. Usually about 0.5 to 3% of free hydroxyl group is present in cellulose acetate butyrate and the substitution is a composite between the di-ester and tri-ester compounds. On the basis of each anhydroglucose unit of cellulose, there may be from as little as 0.5 of acetyl up to 2.2 of acetyl groups per unit and butyryl may vary from about .5 to about .4 groups per unit so that the combination of acetyl and butyryl preferably lies between 2.0 groups per unit to about 3.8. As acetyl increases and butyryl decreases, the solubility in common organic solvents decreases slightly. Conversely with increase in butyryl content the solubility increases. With increase in butyryl content, tensile strength, hardness and melting point decrease whereas there is an increase in flexibility and moisture resistance.

The preferred cellulose acetate butyrate compositions are therefore those which are optimum based upon the experience in producing the crackle coating with these materials, the material having sufficient butyryl content for low moisture resistance and yet not so great a content as would unduly affect the tensile strength and hardness. For practical purposes 37% butyryl is the preferred upper limit, the percentage of acetyl making up the difference to about 40–50% total substitution. With a butyryl content of 50% the composition exhibits hot melting characteristics which are undesirable for the purposes of the present invention. If the film has insufficient adherence there is a tendency to lift at higher butyryl contents, which defeats the very purpose of the crackle coating and in effect permits the destruction of the coating due to its ready removal.

Ethylcellulose is available at ethoxyl substitution from 44.5% to 49.0% plus, in a viscosity range between 6 centipoises and 250 centipoises. It may be blended for different viscosity types to obtain a precise control of concentration and viscosity in spraying compositions containing a volatile organic solvent. The degree of ethoxyl substitution between 47–49% has optimum solubility in a wide range of solvents and in the higher viscosity ranges (higher molecular weights), provides excellent crackle films with unusual resistance to alkali in comparison with nitrocellulose, excellent flexibility, good adherence to the base coat of melamine- or urea-modified alkyd resin despite the incompatibility with the base coat. Because of the excellent resistance to alkali and the low moisture absorption, the ethyl cellulose crackle coating provides a great advantage over nitrocellulose or cellulose acetate. The clarity of the film is equally good as in the case of cellulose acetate butyrate and the life span of the crackle coating is completely adequate for use on automobiles.

Plasticizer may be added to cellulose acetate butyrate or ethyl cellulose in amounts which improve adhesion without detracting from the desirable surface hardness; the usual ester plasticizers for this purpose are well known. The resistance to ultraviolet light is good but may be even further improved without detracting from the transparency of the crackle film; such ultraviolet inhibitors as recommended by Meyer and Gearhart Ind. Eng. Chem. '43, 1585 (1951) may be used.

Since the time and temperature of heating as well as the nature of the pigmented base coating resin effectively control the island dimensions due to shrinkage and adherence of the crackle coating to the base coating and since the spray technique controls the thickness of the base and island coatings, the combination of these two kinds of controls provides for uniform and reproducible results in baking operations as well as in air drying operations. What is accomplished during 30 minutes in the baking operation may take about 2 to 8 hours in an air drying operation at room temperature.

In general, the balanced solvent vehicle for the thermoplastic crackle coat includes a non-blushing strong solvent component, the aliphatic ketones or esters, for example, a hydrocarbon component, naphtha and or toluene and xylene, for example, and a medium or high boiler having a plasticizing function such as one or more of Cellosolve, dioctyl phthalate, tricresyl phosphate, etc., these in proportions as known for the preparation of coating liquids having the desired consistency and viscosity for spray application. A wide range of droplet diameters short of a continuous spray coating is readily achieved through the control of the air pressure and liquid pressure in the spray gun.

The method of the present invention may be used to surface any substrate capable of supporting the continuous base film on the base coating and a variety of such substrates are at hand for the application of the decorative films of the invention to various parts of modern automobiles, aircraft and other vehicles. Thus such surfaces as metal, glass, wood, plaster, paper, concrete block, tile, etc., prepared for the pigmented oleoresinous, alkyd or phenolic base coat, as necessary, should sealing be required, can be decorated for interior or exterior use in accordance with the invention.

Following are specific examples of crackle coatings in accordance with the invention.

EXAMPLE I

An oil modified alkyd resin pigmented light green was made in accordance with the oleoresinous base formula below and sprayed as a continuous coating to a steel panel in a 5 mil. uniform thickness, and air dried until the coating is obtained in the wet set condition. This usually takes from 20 to 60 seconds.

*Light blue green base finish*

|  | Pounds | Gallons |
|---|---|---|
| Titanium Dioxide Pigment: R–610—Dupont | 48 | 1.4 |
| Phthalocyanine Blue—Example: BT–284D—Dupont | 7 | .5 |
| Phthalocyanine Green—Example: GT–674D—Dupont | 5 | .3 |
| #399 Magnesium Silicate S. F.: Whittaker Clark & Daniels | 175 | 8.1 |
| 50% Solid Alkyd Resin Solution—Example: 1307–50–EL Beckosol Reichhold Chemical (medium oxidizing oil-modified alkyd) | 305 | 37. |
| 50% Solid Urea Formaldehyde Resin Solution—Example: #3530 Beckamine Reichhold Chemical | 125 | 15 |
| HiFlash Aromatic Naphtha | 146 | 20 |
| V. M. & P. Naphtha | 110 | 17.7 |
|  | 921 | 100.0 |

Viscosity—28 seconds #4 Ford Cup.
Solids—47%.
Sprayed without reduction.

*Oleoresinous base*

Pigment—54.3%
Vehicle—45.7%

Pigment: Percent
   Titanium calcium _____ 71.8
   Calcium carbonate _____ 28.2
                                                              100.0

Vehicle:
   Varnish _____ 50.0
   V. M. & P. naphtha_____ 50.0
                                                              100.0

Varnish:
   Linseed, C. W. O. phenolic resin_____ 50.0
   V. M. & P. naphtha_____ 50.0
                                                              100.0

The following spatter finish was made up and applied as tiny droplets using a fluid pressure of 2–15 lbs. per square inch and an air pressure of from 20–50 lbs. per square inch. The panel was then baked at 250° F. and produced islands having an average diameter of about ¼ to ½ inch.

*Spatter finish*

|  | Pounds | Gallons |
|---|---|---|
| ½ Sec. Cellulose Acetate Butyrate: 381.5 Tennessee Eastman | 100 | 11 |
| Santocel #54: Monsanto Chemical Co | 12 | 0.7 |
| Cellosolve Acetate: Carbide & Carbon Chemicals Co | 121 | 15 |
| Acetone | 131 | 20 |
| Methyl Isobutyl Ketone | 100 | 15 |
| Toluol | 220 | 30.3 |
| L. D. Naphtha | 50 | 8 |
|  | 734 | 100 |

Viscosity—30 seconds #4 Ford Cup.
Solids—15.3%.
Sprayed without reduction.

An excellent simulated alligator finish is obtained in a single baking schedule having excellent mar- and abrasion-resistance and is admirably suited as an exterior automotive finish.

EXAMPLE II

In place of the alkyd resin of Example I, a non-oxidizing styrenated alkyd resin, Cycopol S101–1 (American Cyanamid Co.), is applied and air dried to the wet, set stage, and in place of cellulose acetate butyrate, ethyl cellulose N–100 type, is used in a solvent consisting of 60 parts by weight of toluene, 20 parts of xylene, 15 parts of ethanol and 5 parts of butanol. The ethyl cellulose is plasticized with 15% diphenyl phosphate and stabilized with 0.5 to 1% of an antioxidant such as diamyl phenol or phenyl beta naphthylamine. A good crackle finish is obtained on the steel panels suitable for use as an exterior automotive finish.

EXAMPLE III

In place of the spatter coating of Example I, a solution of 150 parts Acryloid B–72 (methyl methacrylate) in 100 parts of toluene and containing 40 parts of polyethylene sebacate plasticizer (Paraplex G–50) is used to produce a simulated alligator finish.

In the foregoing examples, a baking schedule of about ½ hour is shown. However, the schedule may be considerably shortened to a time of a few minutes or less in view of the excellent solvent release properties of the oleoresinous base coating. Also the time may be extended to 45 minutes or an hour if desired.

Having disclosed the invention, what is claimed is:

1. A method of making an ornamental protective crackle coating on the surface of an object comprising applying a uniformly pigmented thermosetting synthetic resin enamel base coating in a volatile organic solvent to said surface, permitting the solvent to evaporate from said base coating until the thermosetting resin is set in an immobile solvent-wet condition in which further application of organic solvent from an external source does not lift the pigment nor the resin therein and does not alter the gloss thereof nor spot the same, thereafter spraying onto said base coating in the form of liquid droplets a liquid translucent coating composition in which the vehicle consists of a volatile organic solvent and which contains a light-stable, thermoplastic, low water-absorptive synthetic film-forming polymer as the film-forming agent dissolved therein to form translucent film island areas of substantially uniform thickness which adhere to said base coating, whereafter said coating and base coating are dried to firmly unite said coating to said base coating.

2. A method as claimed in claim 1 wherein said base coating contains a thermosetting synthetic resin film former selected from the group consisting of oil-modified alkyd resins, phenolic resins, epoxy resins, silicone resins and said foregoing resins modified with amino resins.

3. A method as claimed in claim 2 wherein said coating contains a thermoplastic synthetic resin film former selected from the group consisting of ethyl cellulose, cellulose acetate butyrate and methacrylate resins.

4. A method as claimed in claim 2 wherein said resin is an oil-modified alkyd resin which is mixed with an amino resin selected from the group consisting of melamine-formaldehyde resins and urea-formaldehyde resins.

5. A method as claimed in claim 2 wherein said base coating is an epoxy resin.

6. A method as claimed in claim 2 wherein said base coating is a silicone resin.

7. A method as claimed in claim 2 wherein said base coating is a styrenated oil-modified alkyd resin mixed with an amino resin.

8. A method as claimed in claim 3 wherein said thermoplastic synthetic film former is ethyl cellulose.

9. A method as claimed in claim 3 wherein said theromplastic synthetic film former is cellulose acetate butyrate.

10. A method as claimed in claim 3 wherein said thermoplastic synthetic film former is methyl methacrylate polymer.

11. A metal base surface coated with a decorative crackle coating produced by the process of claim 3.

References Cited in the file of this patent

UNITED STATES PATENTS

| | | |
|---|---|---|
| 2,074,814 | Smith | Mar. 23, 1937 |
| 2,186,454 | Gloor | Jan. 9, 1940 |
| 2,304,632 | Faelten | Dec. 8, 1942 |
| 2,326,001 | Ariotti | Aug. 3, 1943 |
| 2,612,456 | Thacker | Sept. 30, 1952 |
| 2,647,095 | Opp | July 28, 1953 |
| 2,714,560 | Hookway | Aug. 2, 1955 |
| 2,715,587 | Armitage | Aug. 16, 1955 |